(12) United States Patent
Bookbinder et al.

(10) Patent No.: US 9,701,564 B2
(45) Date of Patent: Jul. 11, 2017

(54) SYSTEMS AND METHODS OF GLASS CUTTING BY INDUCING PULSED LASER PERFORATIONS INTO GLASS ARTICLES

(71) Applicant: Corning Incorporated, Corning, NY (US)

(72) Inventors: Dana Craig Bookbinder, Corning, NY (US); Lewis Kirk Klingensmith, Corning, NY (US); Stephan Lvovich Logunov, Corning, NY (US); Albert Roth Nieber, Painted Post, NY (US); Helmut Schillinger, Munich (DE); Pushkar Tandon, Painted Post, NY (US); Sergio Tsuda, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/794,378

(22) Filed: Jul. 8, 2015

(65) Prior Publication Data

US 2016/0009586 A1 Jan. 14, 2016

Related U.S. Application Data

(60) Provisional application No. 62/159,573, filed on May 11, 2015, provisional application No. 62/023,450, filed on Jul. 11, 2014.

(51) Int. Cl.
*C03B 33/06* (2006.01)
*C03B 17/04* (2006.01)
(Continued)

(52) U.S. Cl.
CPC ............... *C03B 33/06* (2013.01); *C03B 9/12* (2013.01); *C03B 33/0222* (2013.01);
(Continued)

(58) Field of Classification Search
CPC ........................................................ C03B 33/06
See application file for complete search history.

(56) References Cited

U.S. PATENT DOCUMENTS

| | | |
|---|---|---|
| 1,790,397 A | 1/1931 | Woods et al. |
| 3,647,410 A | 3/1972 | Heaton et al. |
| (Continued) | | |

FOREIGN PATENT DOCUMENTS

| | | |
|---|---|---|
| CN | 102672355 A | 9/2012 |
| CN | 102898014 A | 1/2013 |
| (Continued) | | |

OTHER PUBLICATIONS

Huang et al., "Laser etching of glass substrates by 1064 nm laser irradiation", Applied Physics, Oct. 2008, vol. 93, Issue 1, pp. 159-162.*

(Continued)

*Primary Examiner* — Lisa Herring
(74) *Attorney, Agent, or Firm* — Michael G. Panian; Svetlana Z. Short

(57) ABSTRACT

Embodiments of the present method of laser cutting a laser wavelength transparent glass article comprises feeding at least one glass article to a pulsed laser assembly having at least one pulsed laser, wherein the pulsed laser defines a laser beam focal line with a length of 0.1-100 mm, the glass article being comprised of two end sections, and at least one lateral surface disposed lengthwise between the end sections. The method further comprises laser cutting at least one perforation line onto the lateral surface of the glass article while there is relative motion between the glass article and the pulsed laser and separating the glass article along the at least one perforation line to yield a laser cut glass article.

32 Claims, 12 Drawing Sheets

(51) Int. Cl.

| | | |
|---|---|---|
| *C03B 33/09* | (2006.01) | |
| *C03B 33/10* | (2006.01) | |
| *C03B 33/02* | (2006.01) | |
| *C03B 9/12* | (2006.01) | |
| *C03B 33/095* | (2006.01) | |
| *B23K 103/00* | (2006.01) | |

(52) U.S. Cl.
    CPC ........ *B23K 2203/54* (2015.10); *C03B 33/095* (2013.01); *C03B 33/0955* (2013.01)

(56) References Cited

U.S. PATENT DOCUMENTS

| | | | |
|---|---|---|---|
| 3,775,084 | A | 11/1973 | Heaton |
| 4,226,607 | A * | 10/1980 | Domken ................ A61J 1/065 |
| | | | 65/105 |
| 4,646,308 | A | 2/1987 | Kafka et al. |
| 4,764,930 | A | 8/1988 | Bille et al. |
| 4,907,586 | A | 3/1990 | Bille et al. |
| 4,918,751 | A | 4/1990 | Pessot et al. |
| 5,040,182 | A | 8/1991 | Spinelli et al. |
| 5,265,107 | A | 11/1993 | Delfyett, Jr. |
| 5,400,350 | A | 3/1995 | Galvanauskas |
| 5,436,925 | A | 7/1995 | Lin et al. |
| 5,553,093 | A | 9/1996 | Ramaswamy et al. |
| 5,586,138 | A | 12/1996 | Yokoyama |
| 5,696,782 | A | 12/1997 | Harter et al. |
| 5,736,709 | A | 4/1998 | Neiheisel |
| 5,776,220 | A | 7/1998 | Allaire et al. |
| 6,016,324 | A | 1/2000 | Rieger et al. |
| 6,038,055 | A | 3/2000 | Hänsch et al. |
| 6,055,829 | A * | 5/2000 | Witzmann ............ C03B 33/102 |
| | | | 216/65 |
| 6,078,599 | A | 6/2000 | Everage et al. |
| 6,156,030 | A | 12/2000 | Neev |
| 6,160,835 | A | 12/2000 | Kwon |
| 6,210,401 | B1 | 4/2001 | Lai |
| 6,256,328 | B1 | 7/2001 | Delfyett et al. |
| 6,272,156 | B1 | 8/2001 | Reed et al. |
| 6,339,208 | B1 | 1/2002 | Rockstroh et al. |
| 6,373,565 | B1 | 4/2002 | Kafka et al. |
| 6,381,391 | B1 | 4/2002 | Islam et al. |
| 6,396,856 | B1 | 5/2002 | Sucha et al. |
| 6,407,360 | B1 | 6/2002 | Choo et al. |
| 6,438,996 | B1 | 8/2002 | Cuvelier |
| 6,445,491 | B2 | 9/2002 | Sucha et al. |
| 6,449,301 | B1 | 9/2002 | Wu et al. |
| 6,484,052 | B1 | 11/2002 | Visuri et al. |
| 6,489,589 | B1 | 12/2002 | Alexander |
| 6,501,578 | B1 | 12/2002 | Bernstein et al. |
| 6,552,301 | B2 | 4/2003 | Herman et al. |
| 6,573,026 | B1 | 6/2003 | Aitken et al. |
| 6,729,161 | B1 | 5/2004 | Miura et al. |
| 6,992,026 | B2 | 1/2006 | Fukuyo et al. |
| 7,353,829 | B1 | 4/2008 | Wachter et al. |
| 8,916,798 | B2 | 12/2014 | Plüss |
| 2002/0046997 | A1 | 4/2002 | Nam et al. |
| 2002/0082466 | A1 * | 6/2002 | Han ....................... A61B 18/20 |
| | | | 600/13 |
| 2003/0006221 | A1 | 1/2003 | Hong et al. |
| 2005/0024743 | A1 | 2/2005 | Camy-Peyret |
| 2005/0098548 | A1 | 5/2005 | Kobayashi et al. |
| 2006/0109874 | A1 | 5/2006 | Shiozaki et al. |
| 2008/0000884 | A1 | 1/2008 | Sugiura et al. |
| 2010/0086741 | A1 | 4/2010 | Bovatsek et al. |
| 2010/0089882 | A1 | 4/2010 | Tamura |
| 2010/0102042 | A1 * | 4/2010 | Garner ................ C03B 33/0215 |
| | | | 219/121.68 |
| 2010/0252540 | A1 | 10/2010 | Lei et al. |
| 2010/0252959 | A1 | 10/2010 | Lei et al. |
| 2011/0100401 | A1 * | 5/2011 | Fiorentini ................ B08B 6/00 |
| | | | 134/22.12 |
| 2012/0047951 | A1 * | 3/2012 | Dannoux ................ C03B 17/06 |
| | | | 65/25.3 |
| 2012/0103018 | A1 * | 5/2012 | Lu ....................... C03B 33/0215 |
| | | | 65/29.12 |
| 2012/0196071 | A1 | 8/2012 | Cornejo et al. |
| 2012/0234807 | A1 | 9/2012 | Sercel et al. |
| 2012/0255935 | A1 | 10/2012 | Kakui et al. |
| 2013/0068736 | A1 | 3/2013 | Mielke et al. |
| 2013/0075480 | A1 | 3/2013 | Yokogi et al. |
| 2013/0122264 | A1 * | 5/2013 | Fujii .................... C03B 33/0222 |
| | | | 428/192 |
| 2013/0126573 | A1 | 5/2013 | Hosseini et al. |
| 2013/0133367 | A1 * | 5/2013 | Abramov ................ C03B 17/06 |
| | | | 65/53 |
| 2013/0323469 | A1 | 12/2013 | Abramov et al. |
| 2014/0199519 | A1 | 7/2014 | Schillinger et al. |
| 2015/0140241 | A1 * | 5/2015 | Hosseini ............ B23K 26/0617 |
| | | | 428/34.4 |
| 2015/0158120 | A1 | 6/2015 | Courvoisier et al. |
| 2015/0165563 | A1 | 6/2015 | Manley et al. |
| 2015/0166393 | A1 | 6/2015 | Marjanovic et al. |

FOREIGN PATENT DOCUMENTS

| | | |
|---|---|---|
| CN | 102672355 B | 5/2015 |
| EP | 0609978 A1 | 8/1994 |
| EP | 2754524 B1 | 7/2014 |
| FR | 2989294 | 10/2013 |
| FR | 2989294 A1 | 10/2013 |
| JP | 6318756 A | 11/1994 |
| JP | 11197498 A | 7/1999 |
| JP | 11269683 A | 10/1999 |
| JP | 11330597 A | 11/1999 |
| JP | 11347758 A | 12/1999 |
| JP | 288503 A | 10/2005 |
| JP | 2005288503 A | 10/2005 |
| JP | 2006130691 A | 5/2006 |
| JP | 021548 A | 2/2007 |
| JP | 2007021548 A | 2/2007 |
| JP | 2008168327 A | 7/2008 |
| KR | 1120471 B1 | 3/2012 |
| KR | 2013079395 A | 7/2013 |
| KR | 1344368 B1 | 12/2013 |
| WO | 9929243 A1 | 7/1999 |
| WO | 9963900 A1 | 12/1999 |
| WO | 2011025908 A1 | 3/2011 |
| WO | 2012006736 | 1/2012 |
| WO | 2012006736 A2 | 1/2012 |
| WO | 2012108052 A1 | 8/2012 |
| WO | 2013022148 A1 | 2/2013 |
| WO | 2013138802 | 9/2013 |
| WO | 2013138802 A1 | 9/2013 |
| WO | 2013153195 A1 | 10/2013 |
| WO | 2014079478 A1 | 5/2014 |
| WO | 2014079570 A1 | 5/2014 |
| WO | 2014111385 A1 | 7/2014 |

OTHER PUBLICATIONS

"EagleEtch—The Anti-glare Glass for Technical Display Applications", EuropTec USA Inc., www.EuropTecUSA.com, 8 pages.

Patent Cooperation Treaty International Notification of Transmittal of the International Search Report and The Written Opinion of the International Searching Authority, international application No. PCT/US2015/039919; mailing date Oct. 20, 2015, 14 pages.

Abramov et al., "Laser separation of chemically strengthened glass"; Physics Procedia 5 (2010) 285-290, Elsevier.; doi: 10.1016/j.phpro.2010.08.054.

Arimoto et al., "Imaging properties of axicon in a scanning optical system"; Applied Optics, Nov. 1, 1992, vol. 31, No. 31, pp. 6653-6657.

"TruMicro 5000" Product Manual, Trumpf Laser GmbH + Co. KG, pp. 1-4, Aug. 2011.

Bhuyan et al., "High aspect ratio nanochannel machining using single shot femtosecond Bessel beams"; Applied Physics Letters 97, 081102 (2010); doi: 10.1063/1.3479419.

Bhuyan et al., "High aspect ratio taper-free microchannel fabrication using femtosecond Bessel beams"; Optics Express (2010) vol. 18, No. 2, pp. 566-574.

(56) References Cited

OTHER PUBLICATIONS

Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.

Lapczyna et al., "Ultra high repetition rate (133 MHz) laser ablation of aluminum with 1.2-ps pulses"; Applied Physics A 69 [Suppl.], 5883-5886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"Pharos High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Kruger et al., "Structuring of dielectric and metallic materials with ultrashort laser pulses between 20 fs and 3 ps"; SPIE vol. 2991, 077-786X/97, In Proceedings-SPIE the International Society for Optical Engineering May 9, 1997, pp. 40-47, SPIE International Society for Optical.

* cited by examiner

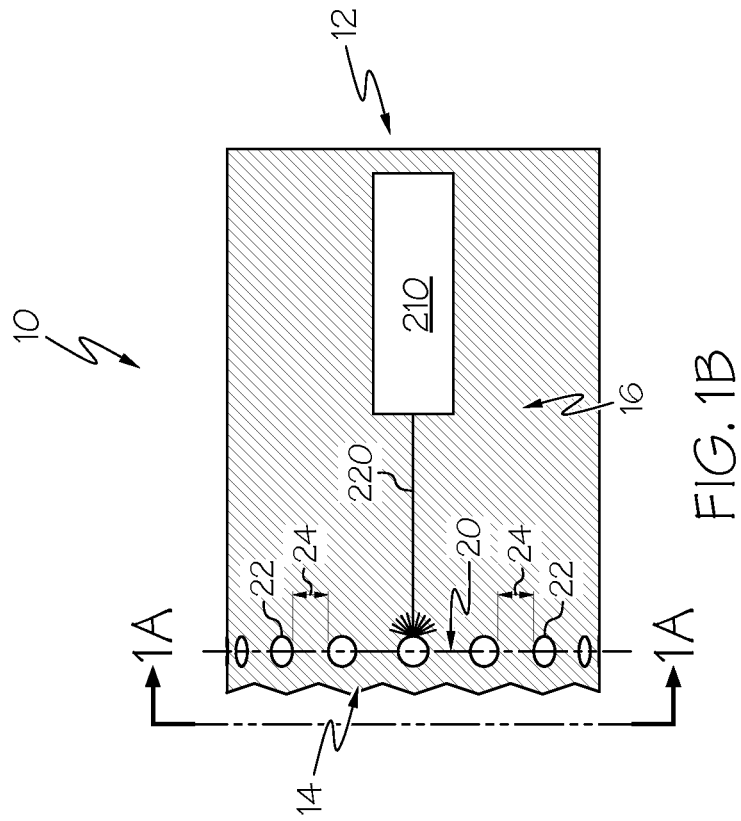
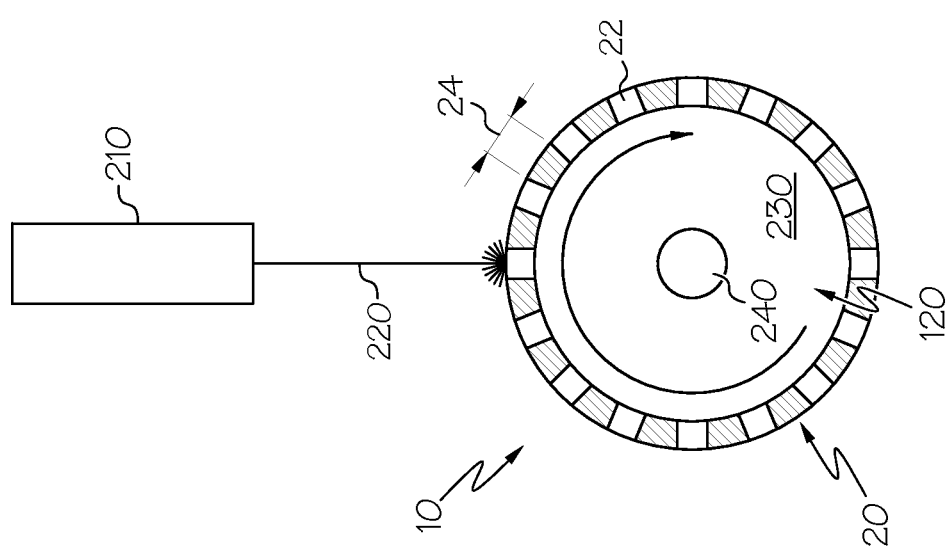
FIG. 1B
FIG. 1A

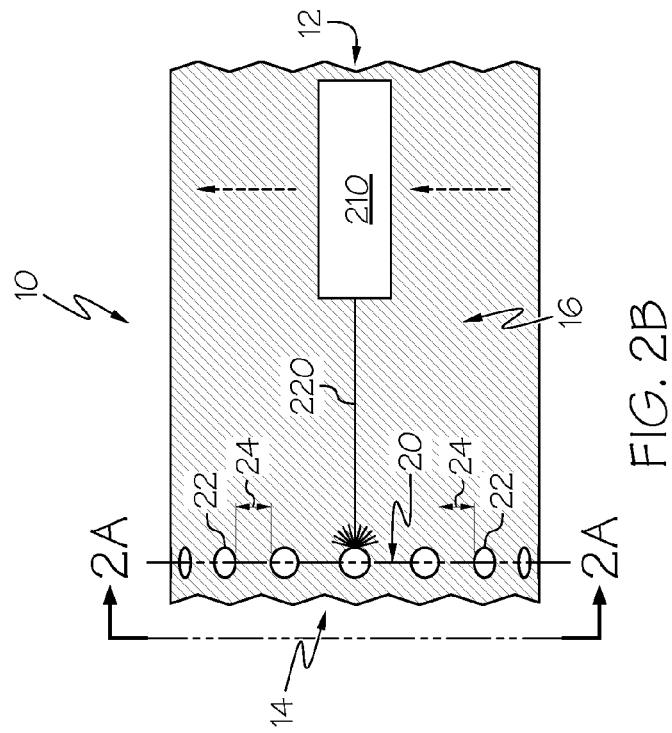
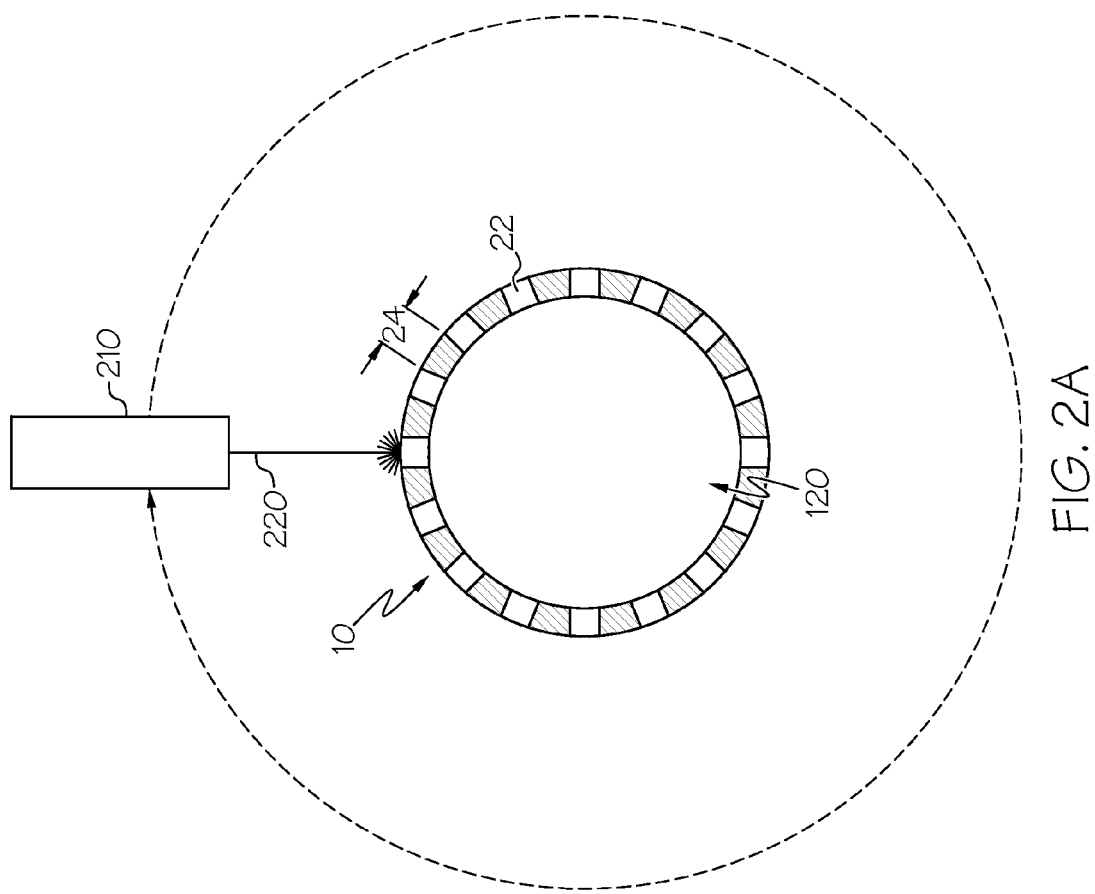

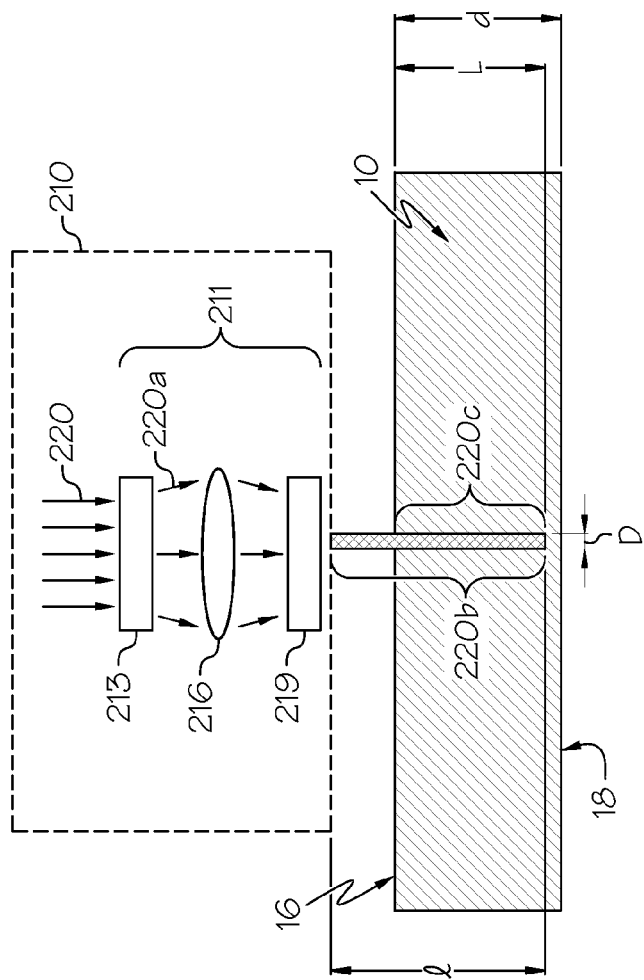
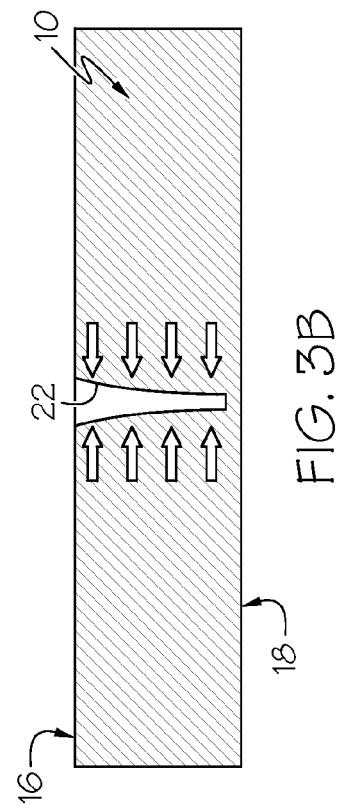
FIG. 3A
FIG. 3B

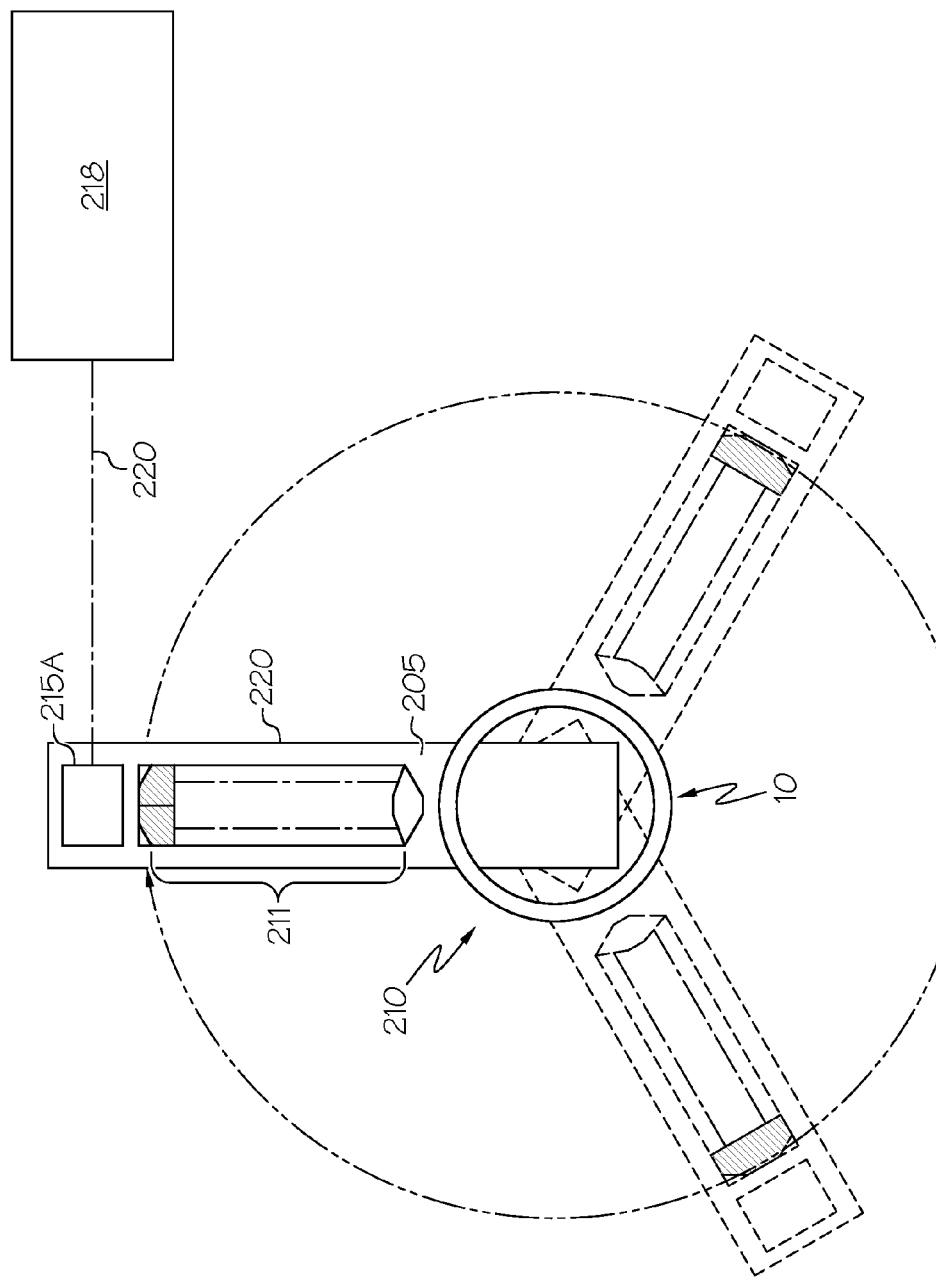

SYSTEMS AND METHODS OF GLASS CUTTING BY INDUCING PULSED LASER PERFORATIONS INTO GLASS ARTICLES

CROSS-REFERENCE TO RELATED APPLICATIONS

This application relates to and claims priority from U.S. Provisional Application Ser. No. 62/023,450 filed on Jul. 11, 2014 and U.S. Provisional Application Ser. No. 62/159,573 filed on May 11, 2015, the contents of each being incorporated herein by reference in its entirety. This application also relates to U.S. Provisional Application Ser. No. 61/752,489 filed on Jan. 15, 2013, and European Application No. EP 13 151 296, filed Jan. 15, 2013, the contents of both being incorporated herein by reference in its entirety.

TECHNICAL FIELD

The disclosure generally relates to glass cutting, and specifically relates to glass cutting using pulsed lasers with a wavelength to which the glass is substantially transparent.

BACKGROUND

Historically, glass has been used as the preferred material for a wide variety of purposes, including packaging for foods, drinks, and pharmaceuticals because of its hermeticity, optical clarity, and excellent chemical durability relative to other materials. However, fast production of glass articles, such as glass containers, has been limited due to contamination of materials housed within glass articles by glass breakage involved in processing the glass articles.

Each glass article has its own specific technical specifications. For example, glass tubes require accurate dimensional tolerances, a low count of particulate, and a proper end profile to enable proper handling downstream and prevent breakage during transport. Residual particles from the tube making process are a critical sensitivity, specifically for pharmaceutical glass tube manufacturers.

Because each glass article generally has its unique specifications, different process steps are generally required to make and cut different glass articles, such as ampoules, vials, cartridges, syringes, etc. Consequently, glass article manufacturers have specific devices optimized and tailored to each specific glass article.

Accordingly, a need exists for alternative methods for forming glass articles and associated apparatus to fabricate glass articles, specifically, glass cutting devices and methods which are suitable across a gamut of glass article components and shapes.

SUMMARY

Embodiments of the present disclosure are directed to systems and methods of precisely cutting a variety of glass articles regardless of shape and dimension using a pulsed laser assembly.

According to one embodiment of the disclosure, a method of laser cutting a glass article is provided. The method comprises feeding at least one glass article to a pulsed laser assembly having at least one pulsed laser, wherein the pulsed laser defines a laser beam focal line with a length of 0.1-100 mm, the glass article, which is transparent to the pulsed laser, being comprised of two end sections, and at least one lateral surface disposed lengthwise between the end sections. The method further comprises laser cutting at least one perforation line in the glass article by focusing the pulsed laser along the laser beam focal line at an angle of incidence onto the lateral surface of the glass article while there is relative motion between the glass article and the pulsed laser. The method additionally comprises separating the glass article along the at least one perforation line to yield a laser cut glass article.

According to another embodiment, a system for laser cutting glass articles is provided. The system comprises a glass synthesis station operable to form a glass article comprised of two end sections, and at least one lateral surface disposed lengthwise between the end sections. The system also comprises a glass cutting station comprising a pulsed laser assembly operable to laser cut at least one perforation line in glass articles received from the glass synthesis station, and a glass support assembly configured to support the laser transparent glass article during laser cutting within the pulsed laser assembly, wherein the pulsed laser assembly and glass support assembly are moveable relative to one another. The pulsed laser assembly comprises a pulsed laser, and an optical assembly positioned in the beam path of the pulsed laser to transform the pulsed laser into a laser beam focal line, the laser beam focal line having a length in a range of between 0.1 mm and 100 mm. The pulsed laser is oriented to induce the perforation line in the glass article along the laser beam focal line onto the lateral surface of the glass article while the glass article and the pulsed laser assembly move relative to each other, and a glass separation station downstream of the glass cutting station and configured to remove a portion of the glass article about the perforation line to produce a laser cut glass article.

Additional features and advantages will be set forth in the detailed description which follows, and in part will be readily apparent to those skilled in the art from the description or recognized by practicing the embodiments as described in the written description and claims hereof, as well as the appended drawings.

BRIEF SUMMARY OF THE DRAWINGS

FIG. 1A is a cross-sectional schematic view depicting the cutting of laser perforations into a cylindrical tube which is rotated relative to the pulsed laser assembly, according to one or more embodiments shown and described herein.

FIG. 1B is a top schematic view depicting the cutting of laser perforations into the cylindrical tube of FIG. 1A, according to one or more embodiments shown and described herein.

FIG. 2A is a cross-sectional schematic view depicting the cutting of laser perforations into a cylindrical tube wherein the pulsed laser assembly rotates around the cylindrical tube, according to one or more embodiments shown and described herein.

FIG. 2B is a top schematic view depicting the cutting of laser perforations into the cylindrical tube of FIG. 2A, according to one or more embodiments shown and described herein.

FIG. 3A schematically depicts the positioning of a laser beam focal line onto a glass article, according to one or more embodiments shown and described herein.

FIG. 3B schematically depicts a perforation induced in a glass article along the laser beam focal line of FIG. 3A, according to one or more embodiments shown and described herein.

FIG. 10 is a schematic front view depicting the rotating pulsed laser assembly wherein the laser is separate from and not rotatably mounted onto the rotating pulsed laser assembly, according to one or more embodiments shown and described herein.

DETAILED DESCRIPTION

Figure 4:
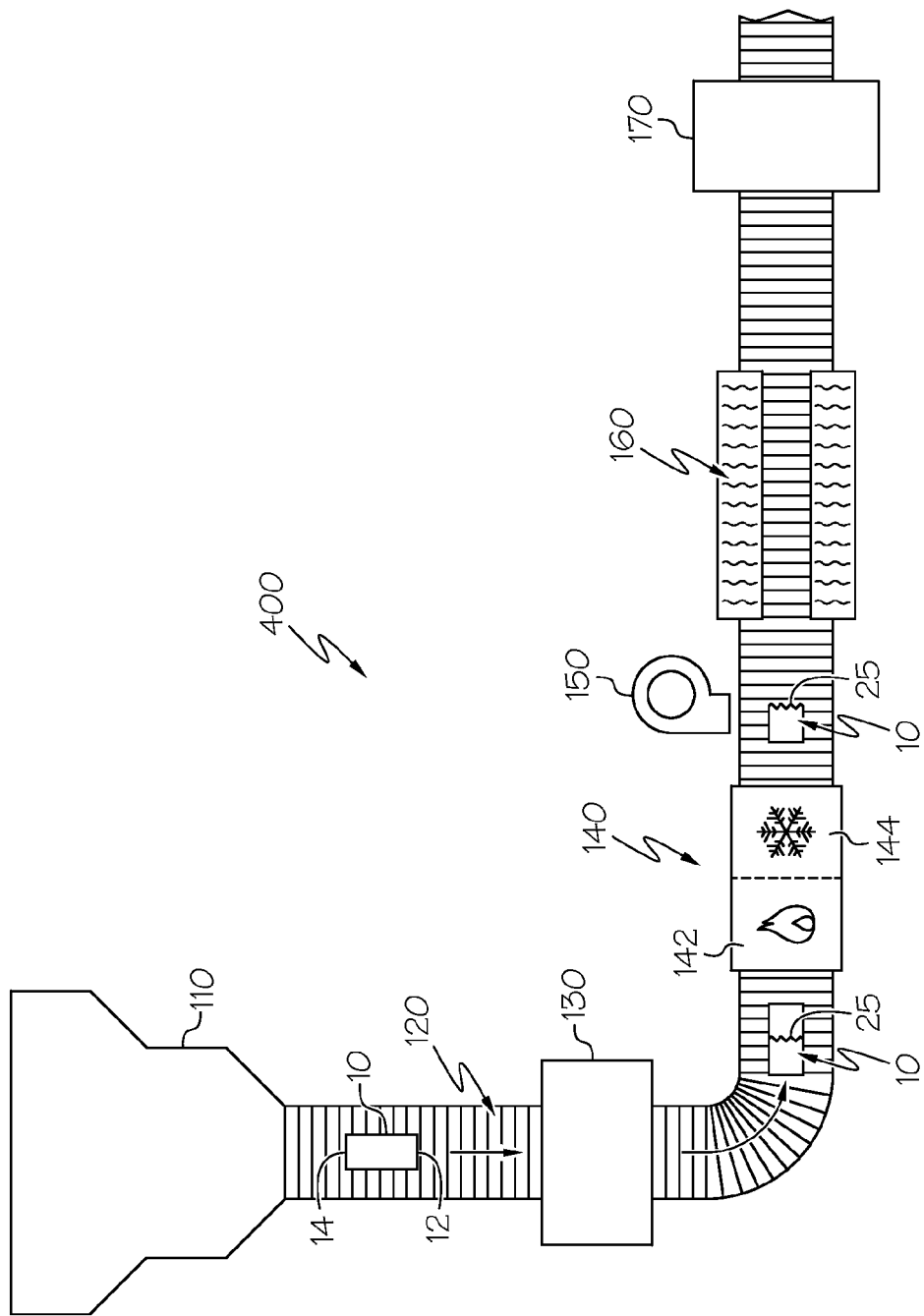
FIG. 4 schematically depicts a conventional glass cutting procedure having a rough cut procedure and downstream thermal shock and fire polishing stations.

Reference will now be made in detail to embodiments of apparatuses and methods for fabricating glass articles utilizing pulsed laser processing, examples of which are illustrated in the accompanying drawings.

As shown in the embodiments of FIGS. 1A-2B, the method of laser cutting perforations includes feeding at least one glass article 10 to a pulsed laser assembly 210 having at least one pulsed laser. As used herein, the glass article may include various components, for example and not by way of limitation, tubes, glass sheets, cartridges, vials, syringes, syringe barrels, vacutainers, ampoules, bottles, flasks, phials, beakers, bulbs, bowls, canisters, capsules, jars, tanks, or the like. While any of these glass article types may be cut using the pulsed laser perforation methodology described herein, many of the embodiments described below will focus on pulsed laser perforations included in pharmaceutical grade glass, specifically pharmaceutical tubes.

As described below, the pulsed laser has a laser beam focal line 220 with a length of 0.1-100 mm. Referring to FIG. 1B, the glass article 10 is comprised of end sections 12 and 14, and at least one lateral surface 16 disposed lengthwise between the end sections 12 and 14. As used herein, "end section" may refer to a base in a cylindrical tube, whereas the lateral surface would constitute the height of the cylindrical tube; however, "end section" is not limited in all embodiments to just the base or a surface adjacent the lateral surface. As shown, the lateral surface for the cylindrical tube of FIG. 1A is continuous; however, the lateral surface 16 for a glass sheet has sides disposed between the end sections 12 and 14.

Referring again to FIG. 1A, the pulsed laser beam focal line 220 induces at least one perforation line 20 in the glass article 10 at an angle of incidence onto the lateral surface 16 of the glass article 10. As shown, the perforation line 20 includes a plurality of spaced perforations 22, which are glass defects, recesses, indents, or holes carved into the glass by the pulsed laser. The perforation line 20 is a plurality of precise narrow holes, which make subsequent separation about the perforation line much easier. These narrow hole dimensions may be dictated by the spot diameter of the laser beam focal line. In exemplary embodiments, the laser beam focal line may have an average spot diameter of between 0.5-5 μm, or 1-2 μm.

The perforations 22, which are depicted for illustration in FIGS. 1A-2B and thereby not drawn to scale, typically are spaced evenly apart; however, it is contemplated that the spacing could be random and uneven. In one embodiment, the perforation line 20 may be a plurality of holes having a size between 200-800 nm, or 300-500 nm. Alternatively, the perforation line may include a spacing therebetween of 1-30 μm, or 1-5 μm, or 1-3 μm. The perforation spacing 24 may be precisely induced by controlling the relative motion of the pulsed laser assembly 210 and the glass article 10. In one embodiment, in a single pass, a laser can be used to create highly controlled full line perforation. An induced absorption may be produced such that the crack formation takes place in the microstructure of the glass article 10 without ablation and without melting of material of the glass article 10. This is in contrast to the typical use of spot-focused laser to ablate material, where multiple passes are often necessary to completely perforate the glass thickness. In further contrast, the ablation process generates large amounts of debris, more extensive sub-surface damage (more than about 100 μm) and edge chipping, whereas the present pulsed laser assembly 210 substantially reduces or eliminates these detrimental side effects.

As shown in FIGS. 1A-2B, while the perforation line 20 is oriented widthwise across the lateral surface 16 and parallel to the end sections 12 and 14, other arrangements for the perforation line 20 are possible, for example, diagonal along the lateral surface 16. While not depicted, it is contemplated that the perforation line 20 could also be applied lengthwise across the lateral surface 16 of the glass article 10.

As shown in FIG. 1A, there must be some relative motion between the glass article 10 and the pulsed laser, specifically the laser beam focal line 220, in order to deliver the plurality of perforations 22 into the glass article 10. For example as shown in FIG. 1A, the glass article 10 may be supported on a spindle 230 which is rotated by a chuck 240 member. The glass article 10 rotates with the rotating spindle 230, and thereby moves relative to the pulsed laser assembly 210. This relative motion produces the perforation line 20 widthwise across the lateral surface 16 of the glass article 10. Alternatively, as shown in FIG. 2A, it is contemplated that the pulsed laser assembly 210 may rotate about the glass article 10 to achieve the relative motion that facilitates the formation of the perforation line 20. Various components are considered suitable for rotating the pulsed laser assembly 210. For example, the pulsed laser assembly 210 could be mounted on a rotating tri-pod or attached to a rotational arm. While the relative motion in FIGS. 1A-2B is rotational motion, translation or other modes of relative motion are also considered suitable. Additionally, the movement of the laser beam focal line, as described below, may be controlled by a mirror galvanometer.

Figure 6:
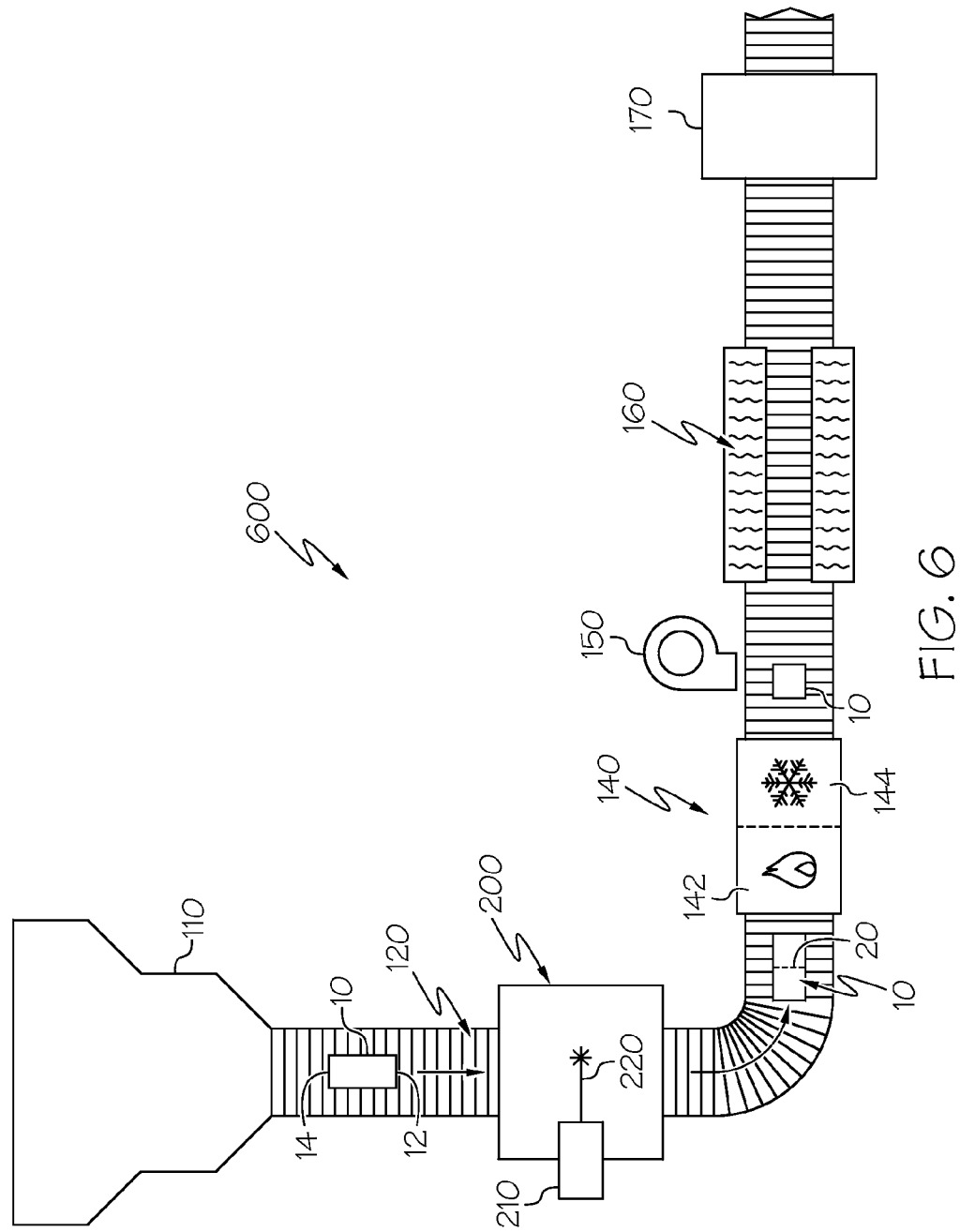
FIG. 6 schematically depicts a pulsed laser assembly disposed upstream of a glass separation station (e.g., a thermal shock device), according to one or more embodiments shown and described herein.

Furthermore, while FIGS. 1A-2B depict the motion of either the glass article 10 relative to the pulsed laser assembly 210 or conversely the motion of the pulsed laser assembly 210 relative to the glass article 10, both components may be moving at the same time. Specifically as shown in FIG. 6, it is contemplated that the glass article 10 may be moved translationally, for example, by a conveyor 120 as the pulsed laser assembly 210 rotates about glass article 10. Consequently, the pulsed laser assembly 210 may not always rotate in a circular path as depicted in FIG. 2A, because the pulsed laser assembly 210 must account for the simultaneous motion of the glass article 10. As a result, the pulsed laser assembly 210 may rotate in a non-circular path, for example, a helical path. Without being bound by theory, in glass manufacturing where parts are produced and cut in rapid succession, embodiments wherein the glass article 10 and pulsed laser assembly 210 are simultaneously in motion may increase glass production speed and efficiency.

Figure 8A:
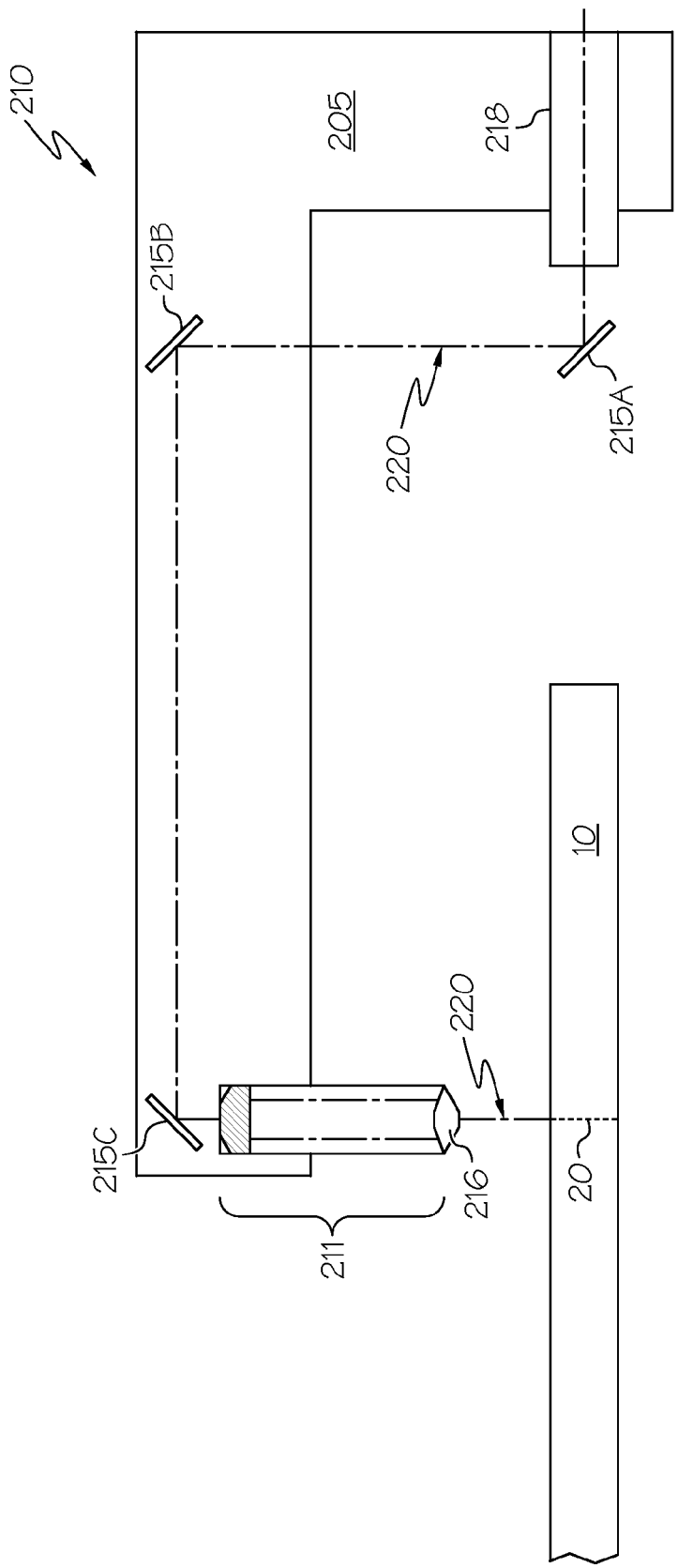
FIG. 8A is a schematic side view depicting the rotating pulsed laser assembly during perforation cutting of a tube, according to one or more embodiments shown and described herein.
Figure 8B:
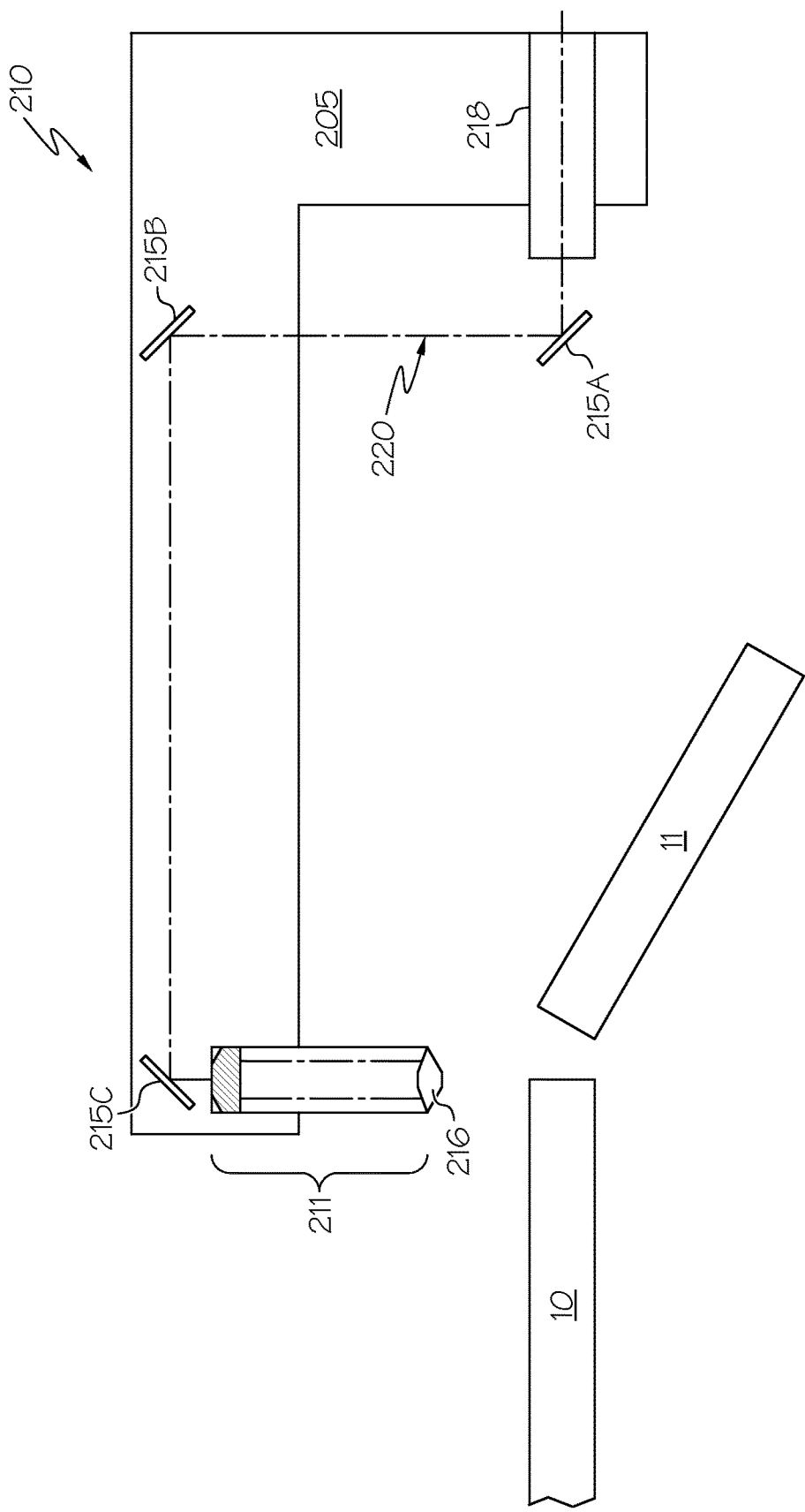
FIG. 8B is a schematic side view depicting the rotating pulsed laser assembly after cutting, according to one or more embodiments shown and described herein.
Figure 9:
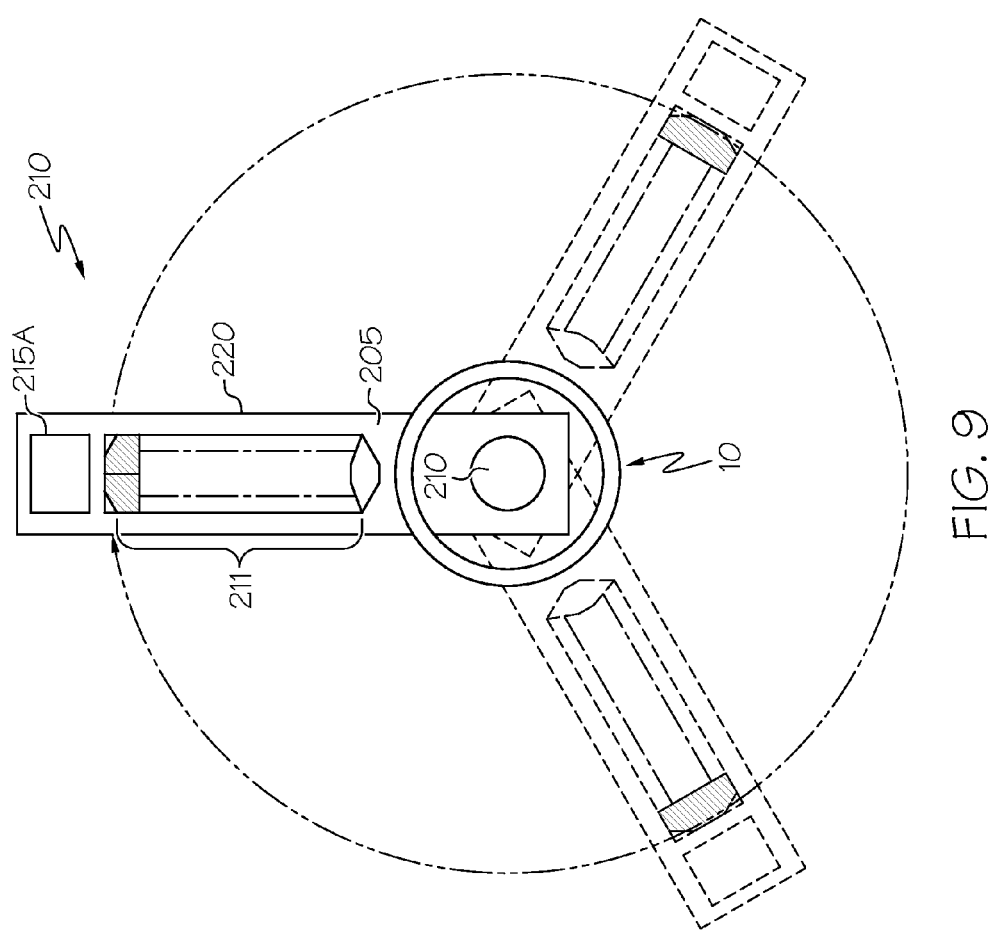
FIG. 9 is a schematic front view depicting the rotating pulsed laser assembly wherein the laser is rotatably mounted on the rotating pulsed laser assembly, according to one or more embodiments shown and described herein.

As stated above and as depicted in FIGS. 8A and 8B, the pulsed laser assembly 210 may comprises a rotational arm 205 configured to rotate the laser beam focal line 220 about the glass article 10. As shown, the pulsed laser assembly 210 comprises one or more mirrors 215A-C coupled to and rotatable with the rotational arm 205. While three mirrors 215A-C are depicted, it is contemplated that more or less mirrors may be utilized to adjust the direction of the laser beam focal line 220. For example, it is contemplated that laser beam device 218, which delivers the pulsed laser, may be disposed in closer proximity to the optical assembly 211 to thereby reduce the number of mirrors used; however, the weight of the laser beam device 218 may be such that its position on the rotational arm 205 depicted in FIG. 8A is more suitable. Referring again to FIG. 8A, when the rotational arm 205 rotates, the laser beam device 218, the mirrors 215A-C, and the optical assembly 211, which are all coupled to the rotational arm 205, all rotate therewith. After the perforation line 20 is induced as shown in FIG. 8A, the laser beam focal line 220 may be temporarily halted while the cut off tube 11 separates from the parent tube (i.e., the glass article 10) as depicted in FIG. 8B. Additional cuts of the cut parent tube 10 may be performed by re-feeding the parent tube to the pulsed laser assembly 210 of FIG. 8A. For further illustration, FIG. 9 depicts a front view of the rotating pulsed laser assembly 210, which is depicted in side view in FIG. 8A.

In an alternative embodiment shown in FIG. 10, it is contemplated that the laser beam device 218 is stationary as well as separate from the rotational arm 205 of the pulsed laser assembly 210, while the optical assembly 211 and the mirrors 215A are still in rotation with the rotational arm 205. Although the laser beam device 218 is stationary, the laser beam focal line 220 is still directed to the moving mirrors 215A and optical assembly 211, which thereby enables the pulsed laser beam focal line 220 to travel rotationally about the glass article 10 regardless.

Other loading and support assemblies for the glass article 10 will be described below. Upon development of the perforation line 20 within the glass article 10, glass article 10 may be separated along that perforation line to yield a cut glass article 10 as described below.

Perforations 22 can be accomplished with a pulse of high energy short duration pulses spaced close together in time. For example, a laser beam pulse duration may be between about 1 picosecond and about 100 picoseconds, or less than 10 picoseconds, or between about 5 picoseconds and about 20 picoseconds. These pulses may be repeated at high repetition rates (e.g. kHz or MHz). For example, the pulse repetition frequency can be in a range of between 10 kHz and 1000 kHz, or between 10 kHz and 100 kHz, or less than 10 kHz.

The wavelength of the laser beam is selected so that the glass article 10 to be laser processed is transparent to the wavelength of the laser. For example, the wavelength may be less than about 1.8 µm, or between about 900 to about 1200 nm. In exemplary embodiments the pulse laser beam has wavelengths such as 1064 nm, 532 nm, 355 nm, or 266 nm. Suitable examples are Nd:YAG lasers with a wavelength of 1064 nm, a Y:YAG laser with a wavelength of 1030 nm. Borosilicate or soda-lime glasses without other colorations (in particular with a low iron content) are optically transparent from about 350 nm to about 2.5 µm.

As shown in FIG. 1A, the laser beam focal line 220 may be delivered to the lateral surface at an angle of incidence, which may vary depending on various factors such as the desired perforation dimensions. For example, the angle of incidence may perpendicular to the lateral surface, or less than or equal to about 45 degrees to the surface of the material.

The intensity of the laser beam may be chosen on the basis of the pulse duration, the pulse energy and the focal line diameter such that there is preferably no significant ablation or significant melting, but preferably only crack formation in the microstructure of the glass. The pulse energy of the laser is preferably chosen such that the intensity in the laser beam focal line produces an induced absorption, which leads to local heating of the material along the focal line 220, which in turn leads to crack formation along the focal line as a result of the thermal stress introduced into the material. In one or more embodiments, the laser beam can have an average laser energy measured at the material less than 700 µJ, or less than about 500 µJ, or less than about 250 µJ.

Various compositions are considered suitable for the glass articles of the present disclosure. For example, the glass may be aluminosilicate glass, such as alkali aluminosilicate or alkaline earth aluminosilicate glass. Alternatively, the glass may comprise borosilicate or soda-lime glass. In one embodiment, the glass may be ion-exchangeable, such that the glass composition can undergo ion-exchange for mechanical strengthening following formation of the glass article 10. The glass composition may be 'Type 1a' and 'Type 1b' glass compositions as defined by the ASTM standard E438.92. In some embodiments, Type 1a and Type 1b glasses have suitable chemical durability for purposes such as pharmaceutical applications. The glass composition may include greater than about 1.0 mol. % boron and/or compounds containing boron, including, without limitation, $B_2O_3$. In another embodiment, the glass compositions from which the glass articles are formed includes less than or equal to about 1.0 mol. % of oxides of boron and/or compounds containing boron. In some of these embodiments, the concentration of oxides of boron and/or compounds containing boron in the glass composition may be less than or equal to about 0.5 mol. %, less than or equal to about 0.4 mol. %, or even less than or equal to about 0.3 mol. %. In some of these embodiments, the concentration of oxides of boron and/or compounds containing boron in the glass composition may be less than or equal to about 0.2 mol. %, or even less than or equal to about 0.1 mol. %. In some other embodiments, the glass composition is substantially free from boron and compounds containing boron. Moreover, the glass article may comprise other components which are transparent to the wavelength of the laser, for example, crystals such as sapphire or zinc selenide. The present disclosure is primarily centered on glass compositions; however, it is contemplated that other structures such as sapphire and zinc tubing may also be cut using the present methodology.

Various thickness, diameters, and lengths are contemplated for the glass articles are considered suitable for the embodiments of the present disclosure. For example, the embodiments will be effective for tube diameters from below 8 mm to over 40 mm, and tube wall thicknesses of about 0.3 to about 2.2 mm, or about 0.5 mm to about 1.1 mm. The length of the tube may also vary. In one embodiment, the tube may be pre-cut to delivery to the pulsed laser assembly, thus the pre-cut tube may have a finite length which may vary based on the demands of the manufacturer. Alternatively, the tube may be delivered uncut to the pulsed laser assembly, and thus essentially has a continuous length prior to being cut by the pulsed laser assembly.

Figure 5:
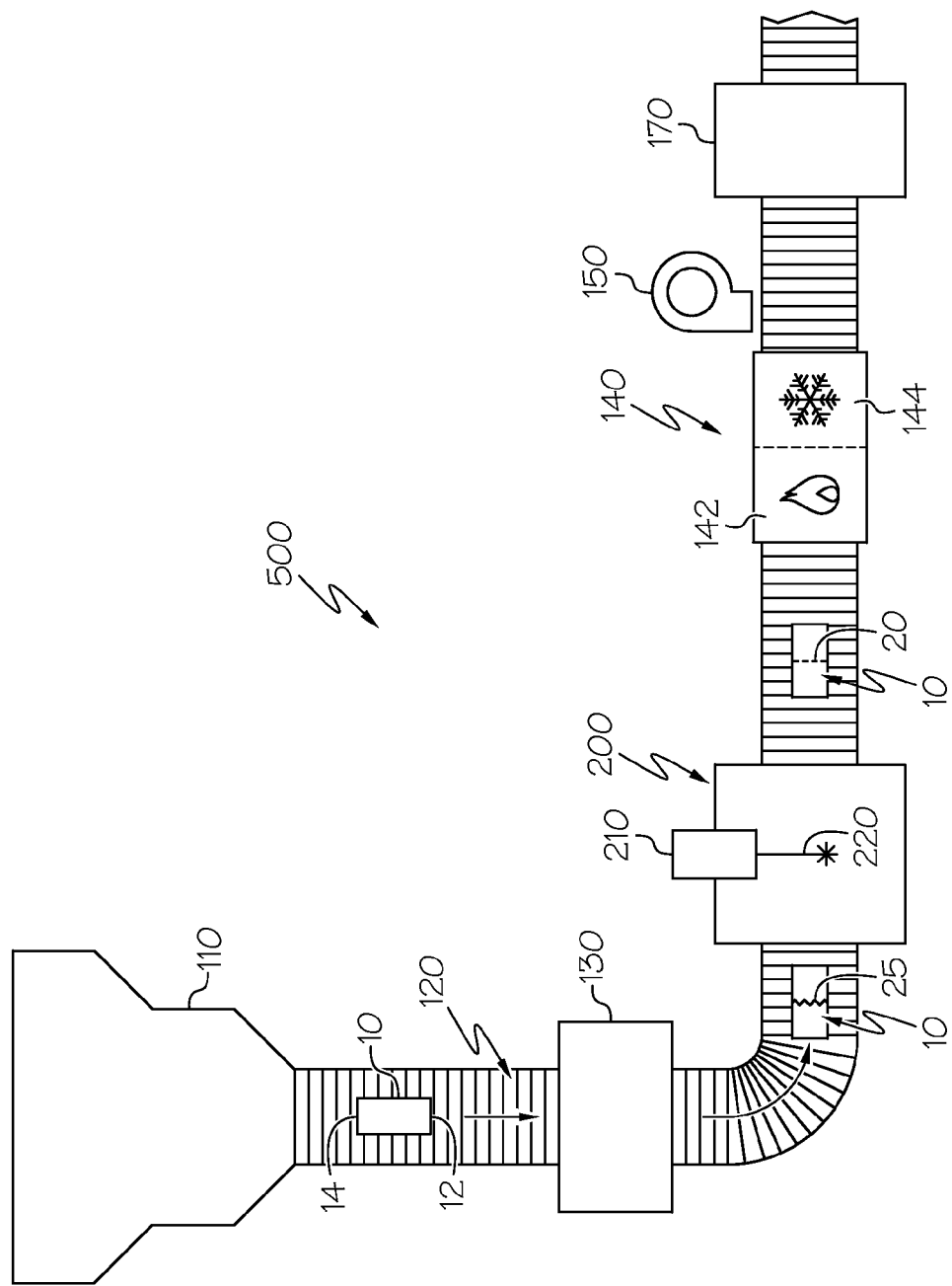
FIG. 5 schematically depicts a pulsed laser assembly utilized downstream of a rough cutting station, according to one or more embodiments shown and described herein.

Referring to FIG. 5, a system for laser cutting glass articles 10 is shown. Specifically, the system comprises a glass synthesis station 110 disposed upstream of a glass cutting station 200, which includes the pulsed laser assembly 210. As used herein, the glass synthesis station 110 may include forming devices used in forming glass articles from molten glass, glass melting devices, glass drawing devices, glass shaping devices, or equipment used in re-shaping glass. The glass synthesis station 110 may utilize a continuous or batch process. In one embodiment, the glass synthesis station 110 comprises a Vello downdraw apparatus used in glass forming, a Danner glass forming apparatus, as well as other conventional or future developed drawing or forming processes. Alternatively as described below and depicted in FIGS. 7A and 7B, the glass synthesis station 110 may comprise a ribbon glass blowing apparatus.

Moreover, the glass synthesis station 110 may also include devices which perform initial cutting in addition to drawing. For example, the tubes may first be drawn and initially cut in a puller cutter machine. Moreover, the glass synthesis station 110 may comprise a tube redrawing device, for example, a sleeve redrawing apparatus which reforms circular tubing into circular and oval shapes.

Referring again to FIG. 5, the glass cutting station 200 may also comprise a glass support assembly 120 in addition to the pulsed laser assembly 210 which laser cuts the perforation line in glass articles 10 received from the glass synthesis station 110. While the glass cutting station 200 herein depicts only one pulsed laser assembly 210, it is contemplated that the glass cutting station 200 may comprises additional pulsed lasers or additional glass cutting devices (not shown). The glass support assembly may include all components which support the glass article 10 during laser cutting by the pulsed laser assembly 210. In one embodiment, the glass support assembly comprises a conveyor 120 disposed between the glass cutting station 200 and the glass synthesis station 110. Additionally, the system 500 may further comprise a conveyor 120 disposed between the glass cutting station 200 and glass separation station 140.

The glass support assembly may include components which hold the glass article 10 in place as the pulsed laser assembly rotates or moves relative to the glass article 10 as depicted in FIG. 2A. Additionally, the glass article 10 may include equipment for rotating or moving the glass article 10 relative to the pulsed laser assembly 210. Referring to the embodiment of FIG. 1A, the glass support assembly is a rotatable spindle 230 rotated by a coaxial chuck 240. While conventional cutting methods are operated at high temperatures and therefore require heat withstanding compositions such as steel, the pulsed laser assembly described herein generates very little heat, and that which is generated is microscopically local heat. As a result, in some embodiments, the glass support assembly 120, for example, the spindle 230, may desirably include compliant gripping material, e.g., polymeric gripping material in contact with the glass article 10. The polymeric gripping material may comprise elastomeric material, for example, rubber. Alternatively, the polymeric gripping material may also comprise polytetrafluoroethylene. In an additional embodiment, the glass support assembly, for example, the spindle 230 may comprise a non-contact support. For example, the non-contact support may be a horizontal air bearing.

Referring to FIGS. 3A and 3B, the pulsed laser assembly 210 of the glass cutting station 200 may comprise an optical assembly 211 positioned in the beam path of the pulsed laser to transform the pulsed laser into a laser beam focal line. In one embodiment, the optical assembly 211 comprises a focusing optical element 216 with spherical aberration configured to generate the laser beam focal line 220. The optical assembly 211 can include an annular aperture 213 positioned in the beam path of the laser 220 before the focusing optical element 216, the annular aperture 213 being configured to block out one or more rays in the center of the laser beam. The focusing optical element 216 can be a spherically cut convex lens, such as a conical prism having a non-spherical free surface, such as an axicon. Optionally, the optical assembly 211 can further include additional components, for example, additional optical elements 219; however, for an axicon focusing optical element, lenses could be eliminated or multiple additional lenses could be incorporated.

Referring to FIGS. 3A and 3B, with suitable laser intensity along the laser beam focal line 220b of focus length 1, the extended laser beam focal line 220b produces perforations 22 in the glass article 10 in the region of coincidence of the laser beam focal line 220b. This perforation 22 of FIG. 5B correlates to laser beam focal line portion 220c of length L. The average spot diameter of the laser beam focal line 220b is denoted here by the reference sign D. As shown in FIGS. 1A and 2A, the perforations 22 extend through the entire thickness of the glass article 10. In an alternative embodiment depicted in FIG. 3B, the perforation 22 may not extend the entire layer thickness d of the glass article; however, this type of perforation line may not sufficiently weaken the glass as well as a perforation line wherein the perforations extend through the entire thickness, thereby potentially requiring more subsequent treatment and processing steps to separate the glass about the perforation line 20.

Additional details regarding optical assemblies and the pulsed laser, which can be applied to generate the focal line 220, as well as a representative optical setup, in which these optical assemblies can be applied, are described in detail in Corning U.S. Patent Application SP13-383PZ/4936.1003-001 Titled "Stacked Transparent Material Cutting With Ultrafast Laser Beam Optics, Disruptive Layers And Other Layers" and the aforementioned European Application No. EP 13 151 296, the teachings of which are incorporated herein by reference in their entirety.

Without being bound by theory, systems using the pulsed laser assembly 210 offer a significant improvement over conventional systems, for example, the conventional system of FIG. 4 used primarily in pharmaceutical tube manufacturing. Referring to the system 400 of FIG. 4, the glass article 10 produced in the glass synthesis station 110 is exposed to a rough cut station 130, typically a mechanical cracking bar configured to propagate a breakage 25 (or breakage line) in the glass article 10. Unlike the precision cutting provided by the pulsed laser assembly 210, the rough cut station 130 is more likely to produce undesirable chips and particles in the glass article 10, which is highly undesirable for pharmaceutical grade glass. While FIGS. 4-6 depicts that the glass article 10 exiting the glass synthesis station 110 is pre-cut prior, this is done primarily for depiction purposes only. It is fully contemplated that the glass article 10 could exit the glass synthesis station 210 having a continuous drawn length.

Referring again to conventional FIG. 4, downstream of the rough cut station 130, the glass article 10 may be fed to a glass separation station 140. The glass separation station 140 may include a $CO_2$ laser used to cleave the glass. Alternatively, the glass separation station 140 may include a mechanical stressing component used to separate the glass. Further as shown in FIG. 4, the glass separation station 140 may also include a thermal shock device 142, 144 used to separate the glass along the breakage line 25. Even after separation, there may be unwanted particles and rough edges in the cut glass article 10. Thus, the system may require an air blower 150 to remove unwanted particles, and a firepolishing station 160 to properly treat the ends of the glass article 10. Moreover, the glass article 10 would also need to go undergo additional processing steps 170, such as washing to ensure that particles were not still present in the glass.

In contrast, referring to the present embodiment of FIG. 5, the system 500 may include a cutting station 130 upstream of the glass cutting station 200 comprising the pulsed laser assembly 210. The upstream cutting station 130 may comprise a mechanical cracking bar about the perforation line 20, a $CO_2$ laser, or another suitable means for propagating a breakage 25 in the glass article. Without being bound by theory, the breakage 25 produced by the rough cut station 130 may be smoothed by the perforation line 20 induced by the pulsed laser assembly 210. By applying a rough cut followed laser induced perforation, the glass separation 140 may be made easier and the yielded glass articles 10 have better end profiles, which limits or eliminates further processing downstream of the glass separation station 140. Without being bound by theory, the precision of the pulsed laser perforations greatly limit chipping and particle formation after separation. Thus, further processing steps after glass separation are minimized or eliminated.

Further as shown in FIG. 5, the glass separation station 140 may in some embodiments include an additional thermal treatment or additional laser treatment; however, it is contemplated that the glass article 10 may undergo separation spontaneously about the perforation line 20. Without being bound by theory, a possible advantage to laser cutting the glass article immediately after the rough cutting station 130 is to take advantage of the elevated temperature of the glass article 10 after draw from the glass synthesis station 110. This allows for separation as the glass article 10 cools to room temperature. Alternatively as shown in FIG. 5, the glass separation station 140 may include a thermal shock device 142, 144. Specifically, the thermal shock device 142, 144 may comprise a heating element 142 such as a hydrogen/oxygen burner, or a $CO_2$ laser. Further, the thermal shock device 140 may comprise a cooling element 144 downstream of the heating element 142.

Further as shown in FIG. 5, the pulsed laser assembly 210 eliminates the need for firepolishing 160 as depicted in FIG. 4 or greatly minimizes the firepolishing time, because the pulsed laser assembly 210 produces such precise narrow perforation lines and allows for such a square clean break.

Without being bound by theory, firepolishing 160 is conducted to heal the edges of glass articles; however firepolishing can create secondary issues, like the deposition of glass volatiles in the case of borosilicate tubing, which is a source of undesired hydrolytic surface contamination issues in pharmaceutical products. Thus, it is beneficial that the pulsed laser assembly 210 reduces or eliminates this firepolishing process in order to limit glass volatiles.

Moreover, the system 500 may optionally include an air blower 150 to remove particles, or additional processing 170 steps such as washing to remove loose particles. To reiterate, in the area of pharmaceutical glass, particle removal is of significant importance.

Referring to the system 600 of FIG. 6, the pulsed laser assembly 210 may receive glass articles directly from the glass synthesis station 110, and thereby eliminate the rough cutting 130 of glass articles 10 shown in FIG. 5. While not limited to these embodiments, the pulsed laser assembly 210 may be the embodiments depicted in FIGS. 9 and 10. Furthermore, continuous tubes exiting the glass synthesis station 110 may be delivered directly to the pulsed laser assembly for laser perforation. In this system 600, the glass separation station 140 may utilize thermal shock; however, it is also contemplated that the glass article may spontaneously separate about the perforation line 20 as the glass article 10 cools to room temperature from the glass synthesis station 110. Thus, this system 600 may only utilize the pulsed laser assembly in the cutting of glass articles 10. System 600 depicts the optional steps of air blowing 150, firepolishing 160, as well as additional processing; however, one or all of these steps are not required.

The systems 500 and 600 depicted in FIGS. 5 and 6 replace various devices such as a Trim and Glaze Machine (TGM) used for tube cutting. The TGM can be visualized as a large oven with a wide conveyor running through the center of it. The TGM takes the oversized glass tubes, heats up an end, and then impacts the desired point with a cold blunt metal object. This causes the glass to break. The process is repeated for the other end, with the conveyor holding the glass so that the cut will be in the correct location. The quality of the ends after the trim step still exhibit chips and are not square to the axis of the tube. As such, once the correct length but with rough edges, the glass tube is flameworked on both ends simultaneously to reduce turnout and strengthen the ends for shipment. The present embodiments generate a small amount of sub-micron particulate—no edge "chipping", whereas the TGM generates large sized particulates (with hot glass). Moreover, the present embodiments have precise dimensional tolerances and therefore high material utilization, whereas the TGM device wastes 5% of the glass in the trim process. The geometric quality of the end produced by the pulsed laser is superior to the flameworked end.

Figure 7A:
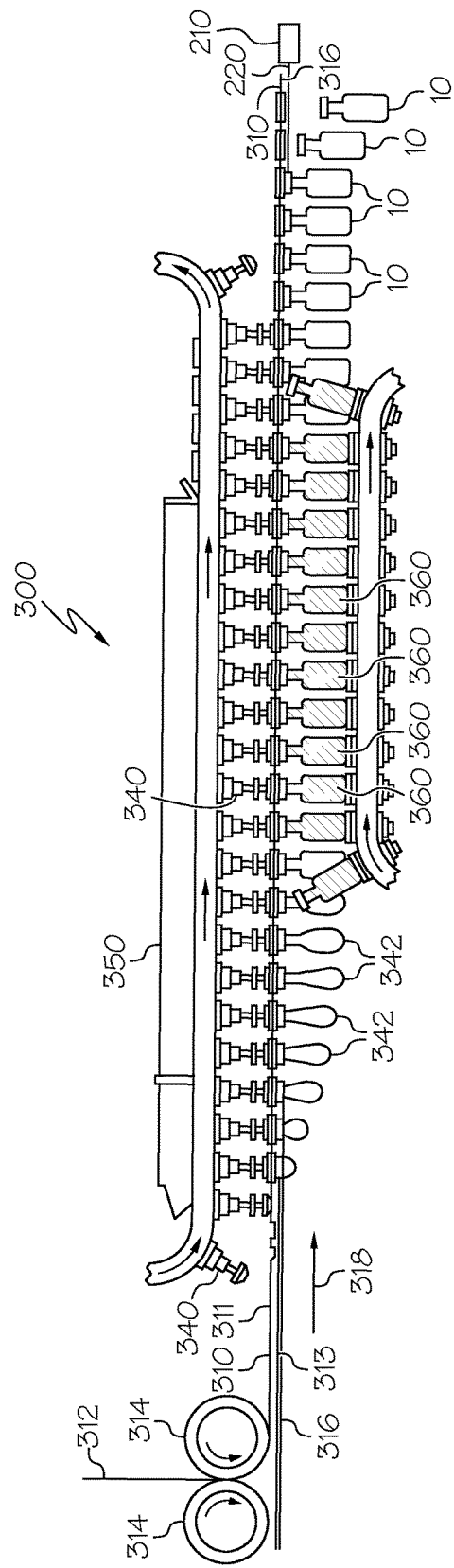
FIG. 7A schematically depicts a side view of a ribbon glass manufacturing apparatus including a pulsed laser assembly, according to one or more embodiments shown and described herein.
Figure 7B:
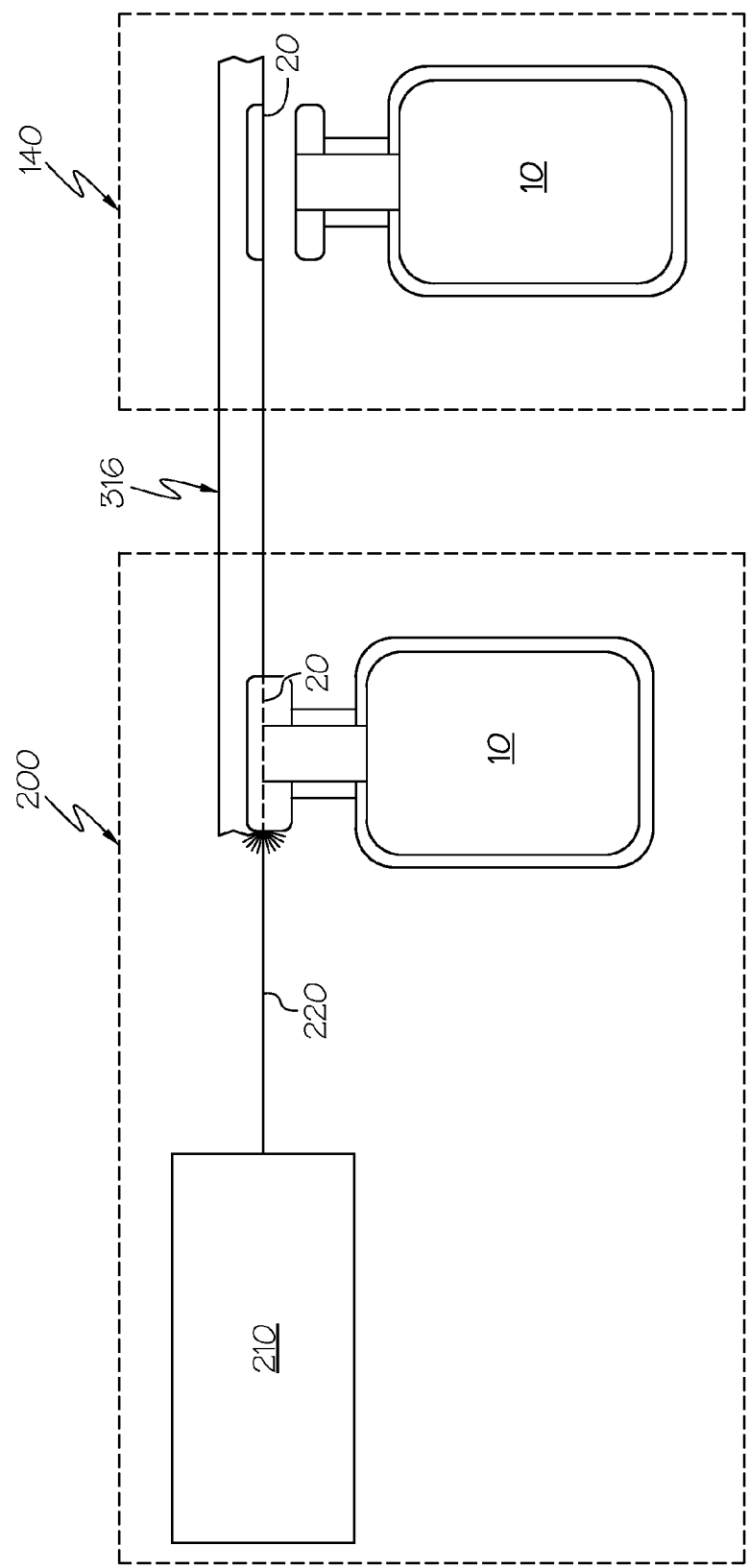
FIG. 7B schematically depicts a side view of a pulsed laser assembly and subsequent separation station included in the ribbon glass manufacturing apparatus of FIG. 7A, according to one or more embodiments shown and described herein.

In addition, the present pulsed laser assembly 210 greatly improves the performance of the glass ribbon machines used in producing vials. Referring to FIGS. 7A and 7B, a glass ribbon machine 300 is depicted. Generally, a glass ribbon 310 is formed by rollers 314 and is transported on a conveyor 316 in a process direction 318 (left to right in FIG. 7A). Glass 312 is melted by a heating source prior to contacting the rollers 314 which reshape the glass 312 into a glass ribbon 310. The glass ribbon 310 generally has a length in the process direction 318 and a thickness (as determined by the area between the rollers 314) which is much less than the length. The thickness is defined as the distance between the topside 311 and the underside 313 of the glass ribbon 310. The topside 311 and the underside 313 of the glass ribbon 310 are substantially planar. As the glass ribbon 310 moves in the processing direction, more hot glass 312 is molded to form the glass ribbon 310 such that the glass ribbon 310 is continuously created as existing sections of the glass ribbon 310 are moved along the process direction 318. The glass ribbon 310 may rest on the conveyor 316 while the conveyor 316 may move in the process direction 318 and carry along the glass ribbon 310.

The glass ribbon 310 is carried in the process direction 318 and parison 342 is formed by the blowhead 340. The blowhead 340 may travel at approximately the same speed as the glass ribbon 310 in the process direction 318 and make contact with the topside 311 of the glass ribbon 310. The blowhead 340 blows gas into the glass ribbon 310 and forms a parison 342 which moves along with the glass ribbon 310 in the process direction 318. As used herein, a "parison" refers to the underhanging glass which is formed from a portion of the glass ribbon 310 by a mechanical force, such as, without limitation, gas blown by an blowhead 340 positioned above the glass ribbon 310. The parison 342 hangs from the glass ribbon 310 and is elongated at least in part by the gas blown from the blowhead 340. The parison 342 may be hollow and may be joined at the glass ribbon 310 at an aperture in the glass ribbon 310 formed by the blowhead 340.

The parison 342 is then shaped into the glass article 10. In one embodiment, the parison 342 is encapsulated by a paste mold 360 which is moved into alignment with the parison 342. The paste mold 360 may have two sides which come together to completely enclose the parison 342. The paste mold 360 may move in the process direction 318 at the same speed as the conveyor 316 moving the glass ribbon 310, and may be generally aligned with the blowheads 340 which have formed the parisons 342. The paste mold 360 has an inner shape which corresponds with the outer shape of the glass article 10 to be formed. The blowhead 340 continues to blow gas into the parison 342 and the parison 342 expands so that it fills the inner shape of the paste mold 360, thus forming the desired shape of the glass article 10.

As shown in FIG. 7A, a plurality of blowheads 340 and paste molds 360 may be continuously cycled into contact with a continuously generated glass ribbon 310. As such, the blowheads 340, paste molds 360, and conveyor 316 moving the glass ribbon 310 all move at about the same speed.

The paste mold 360 then opens and is withdrawn from the formed glass article 10 which hangs from the glass ribbon 310. Once the paste mold 360 is removed, the shape and size of the glass article 10 are that of the final glass article 10 which will be separated from the glass ribbon 310. The blowhead 340 is then withdrawn from the glass ribbon 310, leaving only the glass ribbon 310 and attached glass article 10. The glass ribbon 310 and glass article 10 continues to be moved by the conveyor 316 in the process direction 318. The glass article 10 cools to a hard, solid state. The cooling can be gradual by exposure to ambient conditions or may be a forced cooling process.

Conventional glass ribbon machines may separate glass articles 10 from their attached glass ribbons 310 by a mechanical process. Such a process may create glass chips of greater than about 200 micron. However, the laser processing methods and apparatus described herein may separate the glass articles 10 from the glass ribbon 310 and not form glass chips or other debris of greater than 200 micron. For example, in various embodiments, the debris from laser processing may be small is size, such as less than about 200 microns, less than about 100 micron, less than about 50 micron, less than about 25 micron, or even less than about 10 micron.

Referring to FIG. 7B, the pulsed laser assembly 210 may be oriented adjacent the conveyor 316 at a position wherein the laser beam focal line can apply perforations to the neck of the vial. In this embodiment, the pulsed laser assembly 210 may rotate around the glass article 10, or the conveyor 316 may rotate the glass article 10 as the pulsed laser beam focal line is incident on the neck of the glass article 10. After the perforation 20 is induced, the glass article 10 is fed to a glass separation station, for example, a thermal shock device which separates the glass article about the perforation 20.

In conventional high temperature forming methods, specifically ribbon methods, glass articles such as vials are formed by a process involving exposing a glass tube to high temperatures by direct exposure to flames while rolling the glass of the tube to form the closed bottom of the container. As used herein, processes utilizing a ribbon machine are not "high-temperature." Instead, in the ribbon machine the glass is molded by the paste molds at relatively low forming temperatures. In contrast, the ribbon machine process described herein does not use high temperatures for glass forming, and therefore boron is not substantially volatilized. Therefore, delamination in glass articles formed by the ribbon process is greatly diminished as compared with conventional high-temperature formed glass articles.

It will be apparent to those skilled in the art that various modifications and variations can be made without departing from the spirit or scope of the disclosure. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A system for laser cutting at least one glass article comprising:
    a glass synthesis station operable to form at least one glass article comprised of two end sections, and at least one lateral surface disposed lengthwise between the two end sections;
    a glass cutting station comprising a pulsed laser assembly operable to laser cut at least one perforation line in the at least one glass article received from the glass synthesis station, and a glass support assembly comprising a conveyor configured to support the at least one glass article during laser cutting with the pulsed laser assembly, wherein the pulsed laser assembly and the glass support assembly are moveable relative to one another, and wherein the pulsed laser assembly comprises
    a pulsed laser,
    a rotational arm configured to rotate about the at least one glass article; and
    an optical assembly positioned in a beam path of the pulsed laser to transform the pulsed laser into a laser beam focal line, the laser beam focal line having a length in a range of between 0.1 mm and 100 mm,
    wherein the pulsed laser is oriented to induce absorption within the at least one glass article, generating the at least one perforation line comprising a plurality of non-ablated defects in the at least one glass article along the laser beam focal line onto the lateral surface of the at least one glass article while the at least one glass article and the pulsed laser assembly move relative to each other, wherein the at least one glass article is transparent to a wavelength of the pulsed laser, and wherein each non-ablated defect comprises a size of less than 500 nm; and a glass separation station downstream of the glass cutting station and configured to remove a portion of the at least one glass article about the perforation line to produce a laser cut glass article;

wherein the conveyor of the glass support assembly is operable to move the at least one glass article as the rotational arm rotates about the at least one glass article.

2. The system of claim 1 wherein the optical assembly comprises a focusing optical element configured to generate the laser beam focal line.

3. The system of claim 1 wherein the conveyor is disposed between the glass cutting station and the glass synthesis station.

4. The system of claim 1 further comprising a cutting station upstream of the pulsed laser assembly.

5. The system of claim 1 wherein the glass separation station includes a thermal shock device, a mechanical stressing component, or combinations thereof.

6. The system of claim 5 wherein the thermal shock device includes a heating element selected from the group consisting of a hydrogen/oxygen burner, a $CO_2$ laser, and combinations thereof.

7. The system of claim 6 wherein the thermal shock device comprises a cooling element downstream of the heating element.

8. The system of claim 1 wherein the glass support assembly comprises a polymeric gripping material in contact with the at least one glass article.

9. The system of claim 8 wherein the polymeric gripping material is rubber.

10. The system of claim 1 wherein the glass support assembly comprises a non-contact support.

11. The system of claim 10 wherein the non-contact support is a horizontal air bearing.

12. The system of claim 1 wherein the glass support assembly comprises a rotatable spindle chuck assembly configured to rotate the at least one glass article.

13. The system of claim 1 wherein the pulsed laser assembly comprises one or more mirrors coupled to and rotatable with the rotational arm.

14. The system of claim 1 wherein the pulsed laser and the optical assembly are coupled to and rotatable with the rotational arm.

15. The system of claim 1 wherein the optical assembly is coupled to and rotatable with the rotational arm, while the pulsed laser is stationary but in communication with the optical assembly.

16. The system of claim 1 wherein the glass synthesis station comprises a Vello downdraw apparatus, a Danner glass forming apparatus, or a ribbon glass blowing apparatus.

17. The system of claim 1 wherein the pulsed laser has an average laser energy of less than about 500 μJ.

18. The system of claim 1 wherein the pulsed laser has a pulse duration of between about 10 picoseconds and about 100 picoseconds.

19. The system of claim 1 wherein the pulsed laser has a pulse duration less than 10 picoseconds.

20. The system of claim 1 wherein the pulsed laser has a pulse repetition frequency of between 10 kHz and 1000 kHz.

21. A system for laser cutting at least one glass article comprising:

a glass synthesis station operable to form at least one glass article comprised of two end sections, and at least one lateral surface disposed lengthwise between the two end sections;

a glass cutting station comprising a pulsed laser assembly operable to laser cut at least one perforation line in the at least one glass article received from the glass synthesis station, and a glass support assembly comprising a conveyor configured to support the at least one glass article during laser cutting with the pulsed laser assembly, wherein the pulsed laser assembly and the glass support assembly are moveable relative to one another, and wherein the pulsed laser assembly comprises a pulsed laser, a rotational arm configured to rotate about the at least one glass article; and an optical assembly positioned in a beam path of the pulsed laser to transform the pulsed laser into a laser beam focal line, the laser beam focal line having a length in a range of between 0.1 mm and 100 mm, wherein the pulsed laser is oriented to induce the at least one perforation line in the at least one glass article along the laser beam focal line onto the lateral surface of the at least one glass article while the at least one glass article and the pulsed laser assembly move relative to each other, and wherein the at least one glass article is transparent to a wavelength of the pulsed laser; and a glass separation station downstream of the glass cutting station and configured to remove a portion of the at least one glass article about the perforation line to produce a laser cut glass article;

wherein the conveyor of the glass support assembly is operable to move the at least one glass article as the rotational arm rotates about the at least one glass article.

22. The system of claim 21, wherein the optical assembly comprises a focusing optical element configured to generate the laser beam focal line.

23. The system of claim 21, wherein the glass synthesis station comprises a Vello downdraw apparatus, a Danner glass forming apparatus, or a ribbon glass blowing apparatus.

24. The system of claim 21, wherein the pulsed laser has an average laser energy of less than about 500 μJ.

25. The system of claim 21, wherein the pulsed laser has a pulse duration of between about 10 picoseconds and about 100 picoseconds.

26. The system of claim 21, wherein the pulsed laser has a pulse duration less than 10 picoseconds.

27. The system of claim 21, wherein the pulsed laser has a pulse repetition frequency of between 10 kHz and 1000 kHz.

28. A system for laser cutting at least one glass article comprising:

a glass synthesis station operable to form at least one glass article comprised of two end sections, and at least one lateral surface disposed lengthwise between the two end sections;

a glass cutting station comprising a pulsed laser assembly operable to laser cut at least one perforation line in the at least one glass article received from the glass synthesis station, and a glass support assembly that comprises a non-contact support configured to support the at least one glass article during laser cutting with the pulsed laser assembly, wherein the pulsed laser assembly and the glass support assembly are moveable relative to one another, and wherein the pulsed laser assembly comprises a pulsed laser, an optical assembly positioned in a beam path of the pulsed laser to transform the pulsed laser into a laser beam focal line, the laser beam focal line having a length in a range of between 0.1 mm and 100 mm, wherein the pulsed laser is oriented to induce the at least one perforation line in the at least one glass article along the laser beam focal line onto the lateral surface of the at least one glass article while the at least one glass article and the pulsed laser assembly move relative to each other, wherein the at least one glass article is transparent to a wavelength of the pulsed laser; and a glass separation station downstream of the glass cutting station and configured to remove a portion of the at least one glass article about the perforation line to produce a laser cut glass article.

29. The system of claim 28, wherein the non-contact support is a horizontal air bearing.

30. The system of claim 28, wherein the pulsed laser has an average laser energy of less than about 500 µJ.

31. The system of claim 28, wherein the pulsed laser has a pulse duration of between about 10 picoseconds and about 100 picoseconds.

32. The system of claim 28 wherein the pulsed laser has a pulse repetition frequency of between 10 kHz and 1000 kHz.

* * * * *